United States Patent Office 3,819,824
Patented June 25, 1974

3,819,824
SOLUBLE TABLETS
Gianbattista Crivellaro, Milan, and Francesco Oldani, Trecella, Italy, assignors to Gruppo Lepetit S.p.A., Milan, Italy
No Drawing. Original application Nov. 4, 1970, Ser. No. 86,946, now Patent No. 3,719,599, dated Mar. 6, 1973. Divided and this application Nov. 13, 1972, Ser. No. 306,331
Int. Cl. A61j 3/10; A61k 11/02; C10m 7/48
U.S. Cl. 424—44
4 Claims

ABSTRACT OF THE DISCLOSURE

A lubricating agent suitable for use in the preparation of water soluble tablets and a method of its preparation are disclosed. The agent comprises in combination a composition of substantially anhydrous sodium sulfate and a dimethylpolysiloxane.

---

This is a division of application Ser. No. 86,946, filed Nov. 4, 1970, now U.S. Pat. No. 3,719,599, dated Mar. 6, 1973.

SUMMARY OF THE INVENTION

This invention relates to the production of tablets. More particularly, this invention is concerned with a new and useful lubricating agent suitable for use in preparing water soluble tablets and to a process for manufacturing this agent.

It is a common practice in tablet manufacture to incorporate an active substance into an appropriate excipient. The excipient, in turn, is usually made up of inert powders, one or more lubricants, and if necessary, one or more agents favoring the disintegration of the tablets. When water soluble tablets are to be manufactured, the choice of the appropriate lubricant presents a difficulty in view of the necessity of employing water soluble, tasteless substances which are not toxic and do not foam. These requirements reduce the number of useful lubricants considerably, particularly when a direct compression is to be effected.

In the manufacturing of soluble tablets the choice of a suitable lubricant is essential, also in order to carry out the compression without seizure of the used punches and to make the tablets come out of the machine with a smooth surface without losing fragments which could adhere to the moving part of the machine.

The subject of the present invention is a new lubricating agent for use in the manufacturing of soluble tablets, which lubricant is a composition of substantially anhydrous sodium sulfate having in combination therewith from about 2 to about 7 percent by weight of a dimethylpolysiloxane having a maximum viscosity of about 1,000 centistokes.

A further purpose of the invention consists in a process for preparing the above quality of anhydrous sodium sulfate by dissolving the dimethylpolysiloxane in an appropriate volatile organic solvent, wetting the desired quantity of anhydrous sodium sulfate with the obtained solution and evaporating off the solvent. Any common solvent can be used as the volatile organic solvent provided the solubility in it of the dimethylpolysiloxane is sufficient to carry out the operation in a reasonable volume of liquid. In practice, it is preferred to employ a halogenated hydrocarbon, such as methylene dichloride, chloroform, carbon tetrachloride, and the like which are relatively inexpensive and not easily flammable. After evaporation of the solvent, the residue ordinarily is ground in a mill. This operation can be performed without any difficulty due to the change in the physical properties of the anhydrous sodium sulfate. The obtained powder can be passed through a stainless steel sieve with meshes of convenient size, such as 70–125 mesh per inch. Grinding and sieving can be preferably performed simultaneously in a suitable apparatus, such as the well-known Fitz mill; or sieving can be simply carried out by hand. The modified anhydrous sodium sulfate is then used in manufacture of soluble tablets according to well-known techniques.

To the mass ready for compression, which can be used in the granulated form or as such, the modified anhydrous sodium sulfate is added in the proportion commonly used for the lubricant. The resulting mixture of powders is tabletted by means of normal steel punches employing common tabletting and rotative machines without any supplementary device for the continuous lubrication of the punches during the compression, obtaining in this way a considerable increase of the output for time unit.

A particular utility of the modified anhydrous sodium sulfate can be noticed during the manufacture of soluble effervescent tablets in which are incorporated the usual ingredients destined to the production of carbon dioxide evolution, e.g., alkalies, carbonate or hydrogen carbonate, tartaric acid, citric acid or their partial salts with alkali metals. Moreover, the modified anhydrous sodium sulfate shows a particular utility when, as excipients, are used carbohydrates and their derivatives as a hexitol or a pentitol, such as xylitol, mannitol, sorbitol, etc. or a hexose or a pentose, as for example, glucose, mannose, sorbose, xylose and others; or a reducing disaccharide, chemically defined as hexosylhexose, such as maltose or a nonreducing disaccharide, chemicaly defined as hexosylhexoside, such as sucrose or lactose.

DESCRIPTION OF THE PREFERRED EMBODIMENTS

The following Examples give some indications for preparing the modified anhydrous sodium sulfate and for using it in manufacture of soluble tablets.

Example 1

(a) A solution of dimethylpolysiloxane (500 centistokes viscosity) 2.4 g. and methylene dichloride 24.0 g. is blended with finely powdered anhydrous sodium sulfate 57.6 g. The mass is dried at 35° C. in an air stream until the solvent is removed. The residue is passed through a 75 mesh stainless steel sieve.

(b) In a mixer there are blended crystalline dry xylitol 500 g. and sodium carboxymethylcellulose 20 g.

The mixtures obtained according to (a) and (b) are mixed and the resulting mass is compressed in a tabletting machine provided with stainless steel punches to manufacture tablets 280 mg. in weight. The carboxymethylcellulose employed had a degree of substitution ranging from 0.34 to 0.40 and a sodium content between 4.1 and 4.8 percent. The resulting tablets are shiny and smooth. The dissolution time in water is from 30 seconds to one minute.

Example 2

(a) A solution of dimethylpolysiloxane (350 centistokes viscosity) 5.5 g. and methylene dichloride 50 g. is blended with finely powdered anhydrous sodium sulfate 163 g. The mass is dried at 35° C. in an air stream until the solvent is removed. The residue is pased through a 75 mesh stainless steel sieve.

(b) In a mixer the following ingredients are blended: ascorbic acid 525 g., anhydrous citric acid 584 g., sodium bicarbonate 800 g. and saccharin 7.5 g. This mass is mixed with 60 ml. of methyl alcohol then granulated.

(c) An amount of urea-acetylsalicylate complex 412 g. is blended with a solution of polyvinylpyrrolidone 3 g. and methylene dichloride 200 g. and granulated.

The granulates (b) and (c) are mixed with power (a) and the resulting mass is compressed in a rotative tabletting machine with stainless steel punches to produce tablets with 2.5 g. of weight. The tablets are smooth and shiny. They dissolve in water in about 90 seconds.

Example 3

(a) A solution of dimethylpolysiloxane (200 centistokes viscosity) 4.8 g. and methylene dichloride 48.0 g. is blended with finely powdered anhydrous sodium sulfate 155.2 g. The mass is dried at 35° C. in an air stream until the solvent is removed. The residue is passed through a 75 mesh stainless steel sieve.

(b) In a mixer mannitol 1,840 g. and sodium carboxymethylcellulose 90 g. are blended with the mixture prepared according to (a). The resulting mass is compresed in a tabletting machine provided with stainless steel punches to manufacture tablets weighing 0.5 g. The tablet dissolution time in water is between 30 seconds and one minute.

Example 4

(a) A solution of dimethylpolysiloxane (1,000 centistokes viscosity) 7.2 g. and methylene dichloride 72.0 g. is blended with finely powdered anhydrous sodium sulfate 112.8 g. The mass is dried at 35° C. in an air stream until the solvent is removed. The residue is passed through a 75 mesh stainless steel sieve.

(b) In a mixer sucrose 880 g. and sodium carboxymethylcellulose 40 g. are blended with the mixture prepared according to (a), and the resulting mass is compressed in a tabletting machine provided with stainless steel punches to manufacture tablets weighing 1 g. The tablets are shiny and smooth. The tablet dissolution time in water is between one and two minutes.

Example 5

(a) In a blender are mixed the following ingredients: sucrose 230 g., ascorbic acid 187 g., saccharin 16 g., citric acid (anhydrous) 330 g. and sodium bicarbonate 480 g.

(b) The mass (a) is blended with polyvinylpyrrolidone 60 g. and methylene dichloride 960 g. and granulated.

(c) A solution of dimethylpolysiloxane (400 centistokes viscosity) 2.1 g. and methylene chloride 21 g. is added to 50.4 g. of anhydrous sodium sulfate and the mass is dried at 35° C. in an air stream until the solvent is eliminated. The residue is passed through a stainless steel sieve of 75 mesh per inch.

(d) The granulate (b) is blended thoroughly with the power (c) together with 75 g. of orange flavor powder and the resulting mass is compressed in a tabletting machine with stainless steel punches to form tablets of about 1.6 g. weight. The tablets are bright and smooth. They dissolve in water in about 2 minutes.

Example 6

(a) A granulate is prepared from disodium citrate 365 g., polyvinylpyrrolidone 18 g., and deionized water 36 g.

(b) Separately the following mixture is granulated: sodium bicarbonate 139 g., polyvinylpyrrolidone 3 g. and deionized water 10 g.

(c) A solution of dimethylpolysiloxane (600 centistokes viscosity) 0.9 g. and chloroform 9 g. is added to anhydrous sodium sulfate 21.52 g. and the mass is dried at 35° C. The residue is passed through a sieve 100 mesh per inch.

(d) The following ingredients are accurately mixed: granulated mixture (a) 383 g., granulated mixture (b) 142 g., 16α-methylprednisone hemisuccinate 5.58 g., saccharin 17 g., orange flavor powder 30 g. and powder mixture (c) 22.4 g. The mass is compressed to form effervescent tablets of 600 mg. weight.

Example 7

Following the same order as in Example 2, tablets are prepared from the ingredients hereinafter specified. Each tablet weighs 210 mg.

(a) Granulate disodium citrate 122 g., polyvinylpyrrolidone 6 g., and deionized water 12 g.

(b) Granulate sodium bicarbonate 48 g., polyvinylpyrrolidone 1 g., and deionized water 3 g.

(c) Lubricating powder: anhydrous sodium sulfate 18 g., dimethylpolysiloxane (350 centistokes viscosity) 0.7 g., and carbon tetrachloride 7 g.

(d) Active substances: prednisolone hemisuccinate 1.4 g.

Example 8

Water soluble effervescent tablets each weighing 1.6 g. are prepared through the above described procedure from the following ingredients:

|  | G. |
|---|---|
| Mannitol | 156 |
| Tartrazine yellow | 1 |
| Citric acid, anhydrous | 430 |
| Sodium bicarbonate | 340 |
| Saccharin | 7 |
| Polyvinylpyrrolidone | 40 |
| Anhydrous sodium sulfate | 38 |
| Dimethylpolysiloxane | 1.5 |
| Ethyl alcohol | 15 |
| Metoclopramide HCl | 10.5 |

Example 9

A simple preparation of effervescent tablets is carried out as described in the foregoing Examples, to obtain tablets with the following composition:

|  | G. |
|---|---|
| Citric acid, anhydrous | 0.97 |
| Sodium bicarbonate | 1.63 |
| Acetylsalicylic acid | 0.32 |
| Anhydrous sodium sulfate with 4% of dimethylpolysiloxane (350 centistokes viscosity) | 0.05 |

We claim:

1. In a process for the preparation of water soluble effervescent tablets which comprises providing a solid composition comprising an active substance effervescent couple and an excipient for compression into tablets, mixing said composition with a lubricating agent in the form of a powder, and compressing the resulting mixture into tablets; the improvement which comprises wetting substantially anhydrous sodium sulfate with a solution of a dimethylpolysiloxane in a volatile organic solvent, said dimethylpolysiloxane having a maximum viscosity of about 1,000 centistokes, the ratio of said dimethylpolysiloxane to said sodium sulfate ranging from about 2 to about 7 parts of dimethylpolysiloxane per 100 parts of sodium sulfate, and removing said volatile organic solvent, whereby a solid lubricating agent consisting essentially of the said substantially anhydrous sodium sulfate and the said dimethylpolysiloxane is obtained; and adding said lubricating agent to said composition as the sole essential lubricant and compressing the resulting mixture into tablets.

2. The process of Claim 1 wherein the composition to be compressed is in granulated form.

3. The process of Claim 1 wherein the excipient comprises a member of the group consisting of hexitols, penitols, hexoses, pentoses, reducing disaccharides and non-reducing disaccharides.

4. In a water soluble compressed effervescent tablet comprising an active substance effervescent couple and a lubricant, the improvement wherein the sole essential lubricant is a composition consisting essentially of substantially anhydrous sodium sulfate in combination with a dimethylpolysiloxane, the weight proportions of said dimethylpolysiloxane/sodium sulfate ranging from about 2 to about 7/100, said dimethylpolysiloxane having a maximum viscosity of about 1,000 centistokes.

References Cited

UNITED STATES PATENTS

| | | | |
|---|---|---|---|
| 3,719,599 | 3/1973 | Crivellaro et al. | 252—46.4 |
| 3,518,344 | 6/1970 | Welsh et al. | 424—44 |
| 3,240,712 | 3/1966 | Schulerud et al. | 252—138 |
| 3,125,519 | 3/1964 | Grave et al. | 252—11 |

FOREIGN PATENTS

| | | |
|---|---|---|
| 617,684 | 8/1962 | Belgium. |
| 657,156 | 6/1965 | Belgium. |
| 962,252 | 7/1964 | Great Britain. |

SHEP K. ROSE, Primary Examiner